(12) United States Patent
Itoh et al.

(10) Patent No.: US 11,314,140 B2
(45) Date of Patent: Apr. 26, 2022

(54) FLEXIBLE DISPLAY MODULE AND SWITCH UNIT FOR SWITCHING A DISPLAY PATTERN

(71) Applicant: SONY CORPORATION, Tokyo (JP)

(72) Inventors: Kenji Itoh, Tokyo (JP); Yoichi Ito, Kanagawa (JP); Masakazu Mitsugi, Kanagawa (JP); Seigo Yoneda, Chiba (JP); Masatomo Shimoyama, Aichi (JP); Yoshitaka Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/092,892

(22) PCT Filed: May 2, 2017

(86) PCT No.: PCT/JP2017/017280
§ 371 (c)(1),
(2) Date: Oct. 11, 2018

(87) PCT Pub. No.: WO2017/199770
PCT Pub. Date: Nov. 23, 2017

(65) Prior Publication Data
US 2019/0088212 A1 Mar. 21, 2019

(30) Foreign Application Priority Data
May 19, 2016 (JP) .............................. JP2016-100167

(51) Int. Cl.
*G02F 1/16753* (2019.01)
*A45C 13/08* (2006.01)
(Continued)

(52) U.S. Cl.
CPC ............ *G02F 1/16753* (2019.01); *A45C 3/06* (2013.01); *A45C 13/08* (2013.01); *A45C 15/00* (2013.01);
(Continued)

(58) Field of Classification Search
CPC . A45C 15/00; A45C 15/06; A45F 3/04; A45F 2003/003; G02F 1/167;
(Continued)

(56) References Cited

U.S. PATENT DOCUMENTS

2002/0116851 A1 8/2002 Ferguson
2003/0006693 A1* 1/2003 Topelberg .............. H05B 33/12
313/483
(Continued)

FOREIGN PATENT DOCUMENTS

JP 2007-529777 A 10/2007
KR 20130140949 A * 12/2013
(Continued)

OTHER PUBLICATIONS

The Thread Exchange, Nylon Thread Guide, 2005, https://www.thethreadexchange.com/miva/merchant.mvc?Screen=CTGY&Category_Code=nylon-thread-information, pp. 3-4 (Year: 2005).*

*Primary Examiner* — Alexander Eisen
*Assistant Examiner* — Nathaniel P Brittingham
(74) *Attorney, Agent, or Firm* — Paratus Law Group, PLLC (57) ABSTRACT

The present technology relates to a display module which enables the display module capable of improving a design quality of a product to be applied to various types of products. The display module is provided with a flexible sheet-shaped display unit, a switch unit which switches a display pattern of the display unit, and a control unit which controls a display pattern of the display unit on the basis of (Continued)

a switch control signal from the switch unit. The display unit is electrically connected to the control unit, and the control unit is electrically connected to the switch unit by using a wiring cable. The present technology is applicable to, for example, a bag and the like a display pattern of which may be changed.

6 Claims, 10 Drawing Sheets

(51) Int. Cl.

| | | |
|---|---|---|
| G09F 9/00 | (2006.01) | |
| G09F 23/00 | (2006.01) | |
| G09F 21/02 | (2006.01) | |
| G02F 1/167 | (2019.01) | |
| G09F 9/37 | (2006.01) | |
| G09F 9/30 | (2006.01) | |
| A45C 15/06 | (2006.01) | |
| A45C 3/06 | (2006.01) | |
| A45C 15/00 | (2006.01) | |
| A45F 3/04 | (2006.01) | |
| G06F 3/02 | (2006.01) | |
| G09G 3/34 | (2006.01) | |
| A45F 3/00 | (2006.01) | |

(52) U.S. Cl.
CPC ............... *A45C 15/06* (2013.01); *A45F 3/04* (2013.01); *G02F 1/167* (2013.01); *G06F 3/0202* (2013.01); *G09F 9/00* (2013.01); *G09F 9/30* (2013.01); *G09F 9/372* (2013.01); *G09F 21/026* (2013.01); *G09F 23/00* (2013.01); *G09G 3/344* (2013.01); *A45F 2003/003* (2013.01); *G09F 21/023* (2020.05); *G09G 2320/10* (2013.01); *G09G 2354/00* (2013.01); *G09G 2380/02* (2013.01)

(58) Field of Classification Search
CPC . G02F 3/0202; G09F 9/00; G09F 9/30; G09F 9/372; G09F 21/023; G09F 23/00; G09G 3/344; G09G 2380/02; G09G 2320/10; G09G 2354/00

See application file for complete search history.

(56) References Cited

U.S. PATENT DOCUMENTS

| | | | |
|---|---|---|---|
| 2005/0120458 A1* | 6/2005 | Clark | A41D 27/085 2/69 |
| 2006/0061546 A1* | 3/2006 | Jong | G06F 1/1615 345/156 |
| 2006/0075666 A1* | 4/2006 | Thielemans | G06F 3/1446 40/448 |
| 2006/0202925 A1* | 9/2006 | Manning | G02F 1/13476 345/87 |
| 2007/0177094 A1* | 8/2007 | Van Dam | G02F 1/1339 349/156 |
| 2007/0197115 A1* | 8/2007 | Eves | D03D 1/0088 442/194 |
| 2008/0218369 A1* | 9/2008 | Krans | A47G 9/1045 340/691.1 |
| 2010/0276320 A1* | 11/2010 | Kim | A41F 9/002 206/388 |
| 2011/0124369 A1* | 5/2011 | Yamamoto | G06F 21/74 455/550.1 |
| 2011/0181793 A1* | 7/2011 | Yamamoto | G09G 3/342 348/790 |
| 2011/0187660 A1* | 8/2011 | Hirata | G06F 3/03547 345/173 |
| 2012/0204307 A1 | 8/2012 | De Mattei et al. | |
| 2014/0000771 A1* | 1/2014 | Sherman | A45C 3/06 150/106 |
| 2014/0041772 A1* | 2/2014 | Hayes | A45C 15/06 150/106 |
| 2014/0340591 A1* | 11/2014 | Chang | G06F 3/041 349/12 |
| 2015/0257499 A1* | 9/2015 | Muir | A45C 1/06 150/132 |
| 2015/0370310 A1* | 12/2015 | Hirabayashi | G06F 1/3293 713/323 |
| 2016/0048236 A1* | 2/2016 | Poupyrev | G06F 3/044 345/174 |
| 2016/0284436 A1* | 9/2016 | Fukuhara | D03D 1/0088 |
| 2017/0045797 A1* | 2/2017 | Yamamoto | A41D 23/00 |
| 2017/0124959 A1* | 5/2017 | Kim | G09G 3/3225 |
| 2019/0088212 A1* | 3/2019 | Itoh | A45C 3/06 |

FOREIGN PATENT DOCUMENTS

| | | |
|---|---|---|
| WO | WO 2015/182701 A1 | 12/2015 |
| WO | WO 2016/035571 A1 | 3/2016 |

* cited by examiner

FLEXIBLE DISPLAY MODULE AND SWITCH UNIT FOR SWITCHING A DISPLAY PATTERN

CROSS REFERENCE TO PRIOR APPLICATION

This application is a National Stage Patent Application of PCT International Patent Application No. PCT/JP2017/017280 (filed on May 2, 2017) under 35 U.S.C. § 371, which claims priority to Japanese Patent Application No. 2016-100167 (filed on May 19, 2016), which are all hereby incorporated by reference in their entirety.

TECHNICAL FIELD

The present technology relates to a display module, and especially relates to a display module which enables the display module capable of improving a design quality of a product to be applied to various types of products.

BACKGROUND ART

The present applicant proposes a product a design quality of which is improved by applying a flexible display module with low power consumption referred to as electronic paper and the like to a bag, a bangle (bracelet), a tie (including a bow tie) and the like (for example, refer to Patent Document 1).

CITATION LIST

Patent Document

Patent Document 1: International Publication No. 2015/182701

SUMMARY OF THE INVENTION

Problems to be Solved by the Invention

However, for example, bags include many types and shapes such as tote bags, clutch bags, overnight bags, and backpacks, and a cost increases if the display module is designed for each of them.

The present technology is achieved in view of such a situation, and an object thereof is to make a display module capable of improving a design quality of a product applicable to various types of products.

Solutions to Problems

A display module according to an aspect of the present technology is provided with a sheet-shaped display unit having flexibility, a switch unit which switches a display pattern of the display unit, and a control unit which controls the display pattern of the display unit on the basis of a switch control signal from the switch unit, in which the display unit is electrically connected to the control unit, and the control unit is electrically connected to the switch unit by using a wiring cable.

According to an aspect of the present technology, a sheet-shaped display unit having flexibility, a switch unit which switches a display pattern of the display unit, and a control unit which controls the display pattern of the display unit on the basis of a switch control signal from the switch unit are provided, in which the display unit is electrically connected to the control unit, and the control unit is electrically connected to the switch unit by using a wiring cable. Then, the display pattern of the display unit is controlled on the basis of the switch control signal from the switch unit.

The display module may be an independent device or may be an internal block which forms one device.

Effects of the Invention

According to an aspect of the present technology, a display module capable of improving a design quality of a product may be applied to various types of products.

Note that the effects herein described are not necessarily limited and may be any of the effects described in the present disclosure.

MODE FOR CARRYING OUT THE INVENTION

A mode for carrying out the present technology (hereinafter, referred to as an embodiment) is hereinafter described. Note that the description is given in the following order.
1. Configuration Example of Bag
2. Control Block Diagram
3. Display Control Process in Manual Mode
4. Display Control Process in Automatic Mode
5. Application Example to Other Bags
6. Another Configuration Example of Display Module
7. Another Configuration of Connecting Unit
8. Application Example to Other Articles <1. Configuration Example of Bag>

Figure 1:
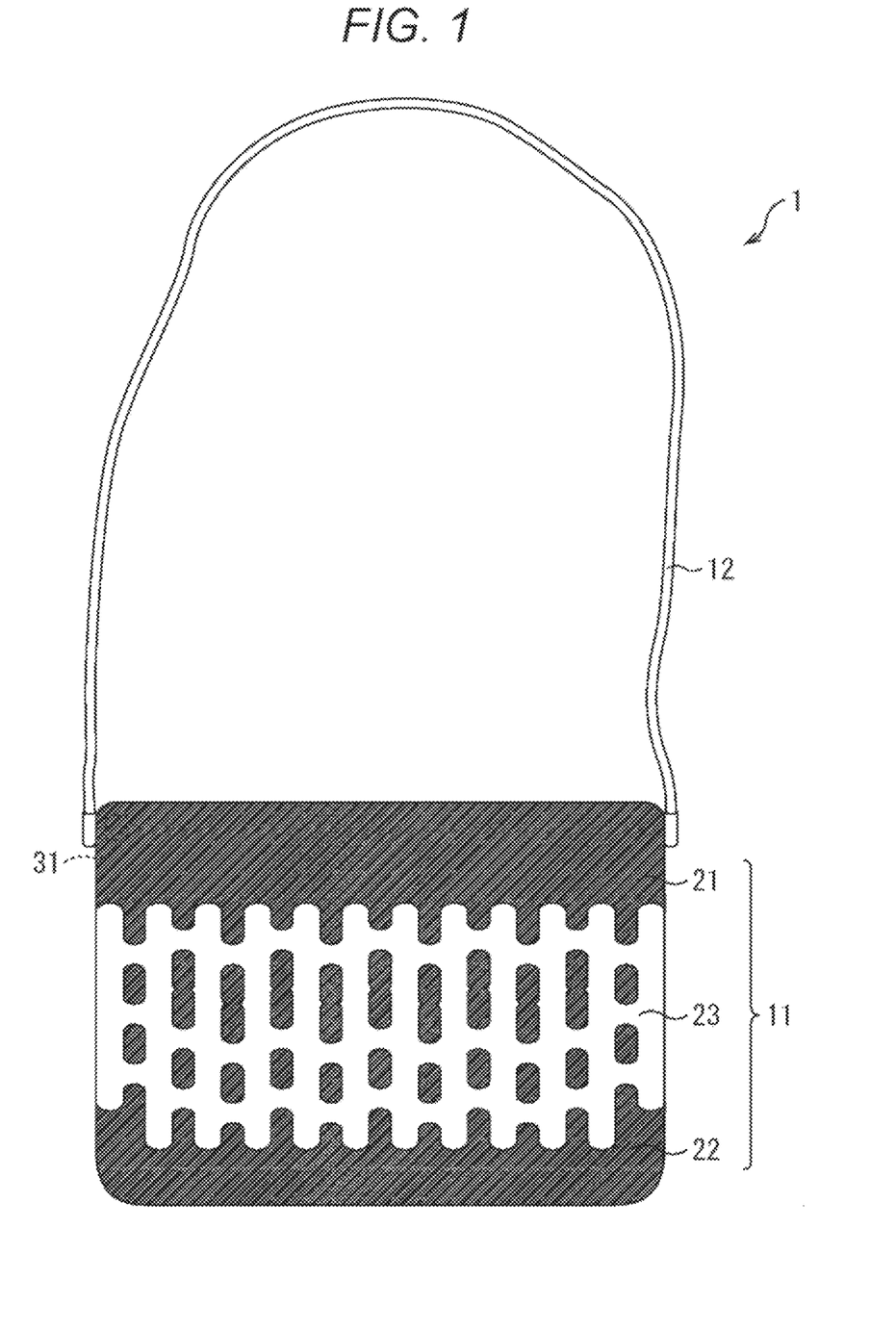
FIG. 1 is a view illustrating a configuration example of a bag as an embodiment to which the present technology is applied.

FIG. 1 is a view illustrating a configuration example of a bag as an embodiment to which the present technology is applied.

A bag 1 in FIG. 1 is a shoulder bag including a main body portion 11 forming a storage unit and a shoulder strap 12. The main body portion 11 includes a main body upper portion 21, a main body bottom portion 22, and a display module 23 between the main body upper portion 21 and the main body bottom portion 22.

As a member such as the main body upper portion 21, the main body bottom portion 22, and the shoulder strap 12, cloth such as cotton and linen, leather, and fabric of synthetic fiber such as nylon and polyester are used, for example.

The display module 23 is a module including a flexible display a form of which may be flexibly deformed to a curved surface shape and the like. The flexible display includes an electrophoretic display also referred to as so-called electronic paper or EPD.

The electrophoretic display is characterized by its low power consumption. That is, the electrophoretic display does not require backlight necessary for a liquid crystal display (LCD). Also, in the electrophoretic display, it suffices to flow current only when display is switched, and it is not necessary to flow current in order to maintain the display. Therefore, the electrophoretic display may display with extremely low power consumption as compared with the LCD and the like.

Also, another characteristic of the electrophoretic display is its flexibility. That is, the electrophoretic display has an extremely thin film shape and may change the shape freely to some extent.

A pattern changing switch 31 for switching a display pattern of the display module 23 is arranged in a part easy to operate by a user when the user uses the bag, for example, in the vicinity of an attaching portion of the shoulder strap 12 on an inner side of the main body upper portion 21.

Figure 2:
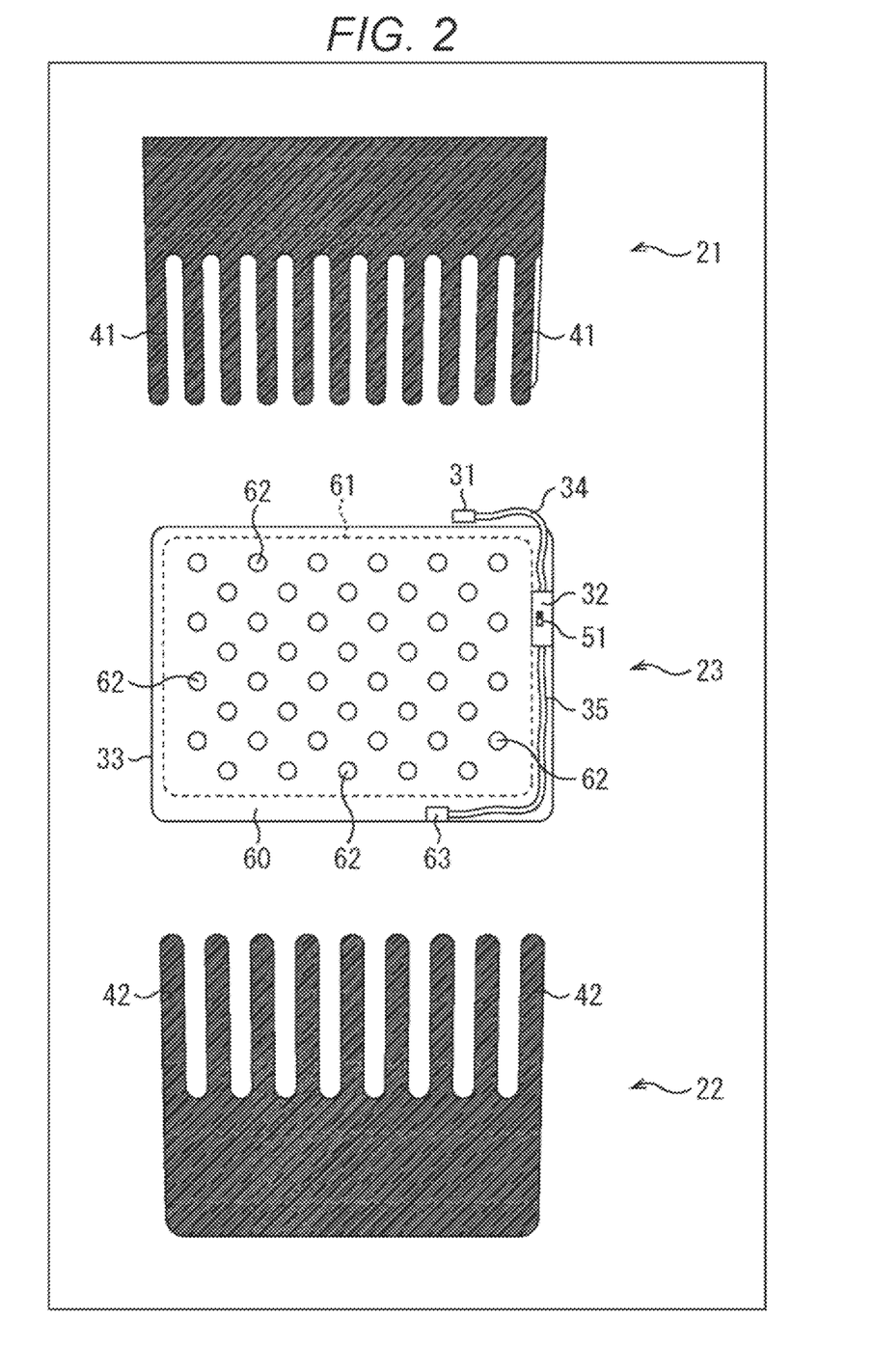
FIG. 2 is a view illustrating a main body portion of the bag exploded into a main body upper portion, a main body bottom portion, and a display module.

FIG. 2 is a view illustrating the main body portion 11 of the bag 1 exploded into the main body upper portion 21, the main body bottom portion 22, and the display module 23.

A lower side of the main body upper portion 21 on a side of the display module 23 has a comb-teeth shape in which a plurality of elongated connecting units 41 having a short lateral width and a long length in a longitudinal direction (vertical direction) is arranged at regular intervals in a lateral direction.

An upper side of the main body bottom portion 22 on a side of the display module 23 also has a comb-teeth shape in which a plurality of elongated connecting units 42 having a short lateral width and a long length in the longitudinal direction is arranged at regular intervals in the lateral direction.

Note that a cross-sectional shape of the connecting unit 41 or 42 may be a circular shape such that the connecting units 41 or 42 as a whole form a rod shape, or may be a quadrangular shape such that the connecting units 41 or 42 as a whole form a flat plate shape.

The display module 23 includes the pattern changing switch 31, a battery box 32, and a display unit 33. The pattern changing switch 31 and the battery box 32 are electrically connected to each other by a wire harness 34, and the battery box 32 and the display unit 33 are also electrically connected to each other by a wire harness 35. The wire harness 35 is connected to a connecting terminal 63 of the display unit 33. Each of the wire harnesses 34 and 35 is a bundle of a plurality of electric wiring cables.

The battery box 32 is provided with a mode selector switch 51 which switches between an automatic mode which is a first operation mode and a manual mode which is a second operation mode.

The display unit 33 has a thin sheet shape and is flexible, and includes a non-display area 60 on an outer peripheral portion and a display area 61 on an inner side thereof in a planar direction with the electrophoretic display formed in the display area 61. In the display area 61, a plurality of holes 62 is provided as a connecting unit for connecting to the connecting unit 41 of the main body upper portion 21 or the connecting unit 42 of the main body bottom portion 22.

FIG. 2 illustrates an example in which a large number of holes 62 provided on the display unit 33 are arranged in a checkered pattern shifted by half a pitch from adjacent columns; the arrangement of the holes 62 is not limited thereto and arrangement in a matrix manner is also possible, for example. The checkered arrangement is preferable because stress is uniformly dispersed.

Also, a shape of the hole 62 is not limited to a circular shape as in this embodiment. For example, this may be a square (quadrangle), a hexagon, or the like.

Figure 3:
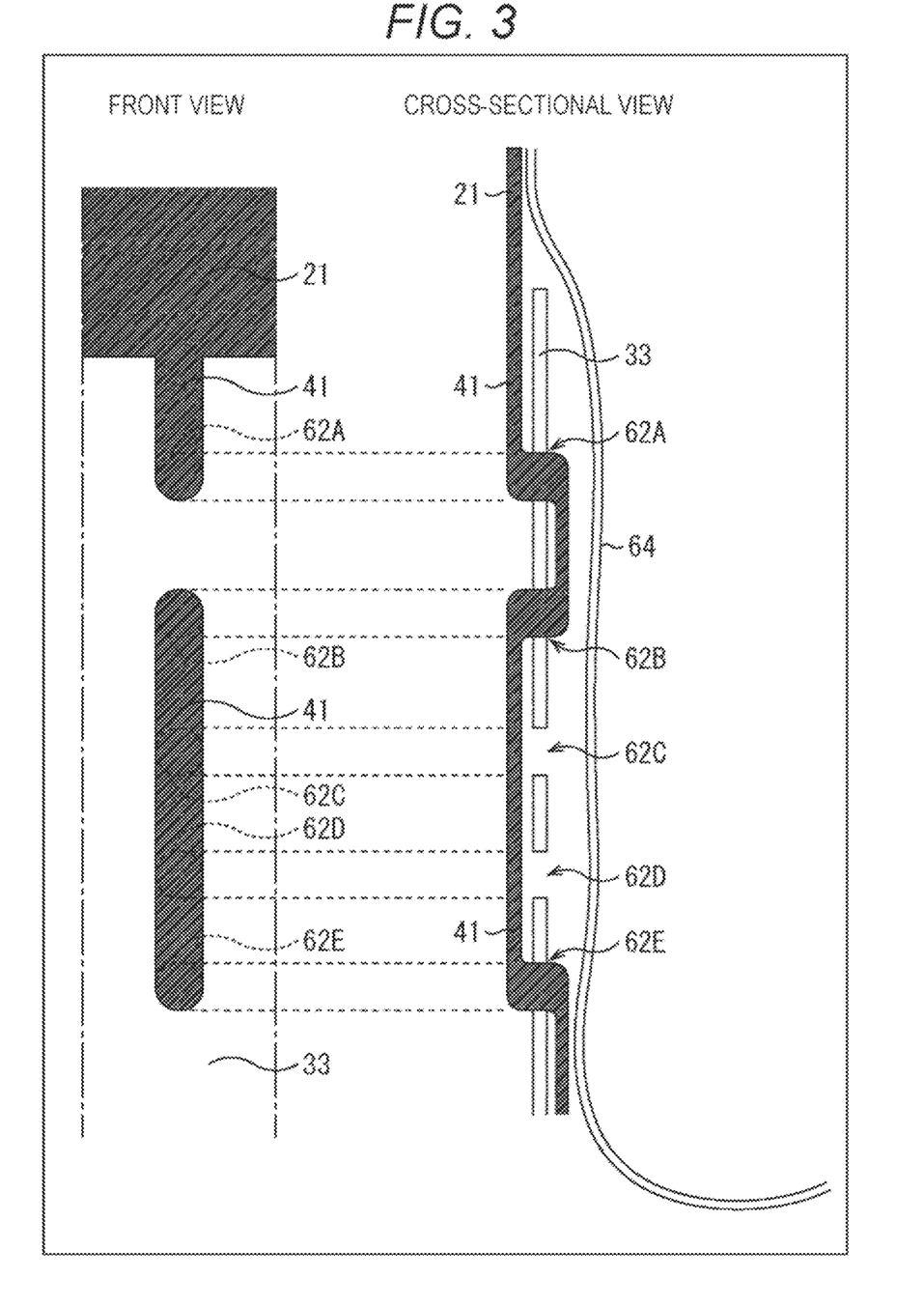
FIG. 3 is a view for illustrating a method of connecting the main body upper portion or the main body bottom portion to a display unit.

Next, with reference to FIG. 3, a method of connecting the main body upper portion 21 or the main body bottom portion 22 to the display unit 33 is described.

FIG. 3 is a front view and a cross-sectional view illustrating a connecting state between one of the elongated connecting units 41 of the main body upper portion 21 and the display unit 33.

A plurality of holes 62 is formed at predetermined intervals in the longitudinal direct on (vertical direction) in the display unit 33, and as illustrated in FIG. 3, the elongated connecting unit 41 of the main body upper portion 21 is inserted in a plurality of holes 62, so that the main body upper portion 21 and the display unit 33 are connected to each other. In the example in FIG. 3, the connecting unit 41 is allowed to pass through a predetermined hole 62A from a front surface to a rear surface of the display unit 33, pass through a predetermined hole 62B from the rear surface to the front surface of the display unit 33, and pass through a predetermined hole 62E from the front surface to the rear surface of the display unit 33. In the bag 1, an area of the display unit 33 in which the connecting unit 41 allowed to pass through the hole 62 is arranged on the front surface forms a non-display area of which display does not change in appearance.

It is possible that a tip end of the connecting unit 41 allowed to pass through a plurality of holes 62 of the display unit 33 is fixed to the main body bottom portion 22 by a predetermined fixing method (for example, a hook-and-loop fastener or suture) or is not fixed. Since an inner bag 64 is stitched inside the main body upper portion 21 and a load of an article accommodated in the bag 1 is supported by the inner bag 64, a large load is not applied to the display unit 33 and the main body bottom portion 22.

Although the connecting state between the elongated connecting unit 41 of the main body upper portion 21 and the display unit 33 is illustrated in FIG. 3, similarly for the connecting unit 42 of the main body bottom portion 22 and the display unit 33, the elongated connecting unit 42 is allowed to pass through a plurality of holes 62 of the display unit 33, so that the main body bottom portion 22 and the display unit 33 are connected to each other.

As described above, in the display module 23, a plurality of holes 62 is provided as the connecting unit for connecting to other members forming the bag 1, and the other members (the elongated connecting unit 41 of the main body upper portion 21 and the elongated connecting unit 42 of the main body bottom portion 22) are allowed to pass through the holes 62, so that the display module 23 is connected to the other members. As a result, for example, as compared with a case of connecting to the other members by machine sewing or with adhesive paper, assembly becomes easy and disassembly is also easy, so that reworking is also possible. For example, when repairing a part of the bag 1 and the like, the display module 23 may be reused and serviceability is improved.

Also, in the display module 23, three components of the pattern changing switch 31, the battery box 32, and the sheet-shaped display unit 33 are connected to one another by the wire harnesses 34 and 35. As a result, it is possible to arrange each of the pattern changing switch 31 and the battery box 32 in an arbitrary part according to usability of the bag 1 only by changing lengths of the wire harnesses 34 and 35. Since the wire harness is strong against bending and impact as compared with a flexible substrate or the like, reliability of the display module 23 may also be improved.

<2. Control Block Diagram>

As described above, the display module 23 is used as a part of the fabric which decorates the outside of the bag 1, in which the display unit 33 may display a plurality of display patterns in a switching manner, thereby improving a design quality of the bag 1.

Next, control of the display pattern of the display module 23 is described.

Figure 4:
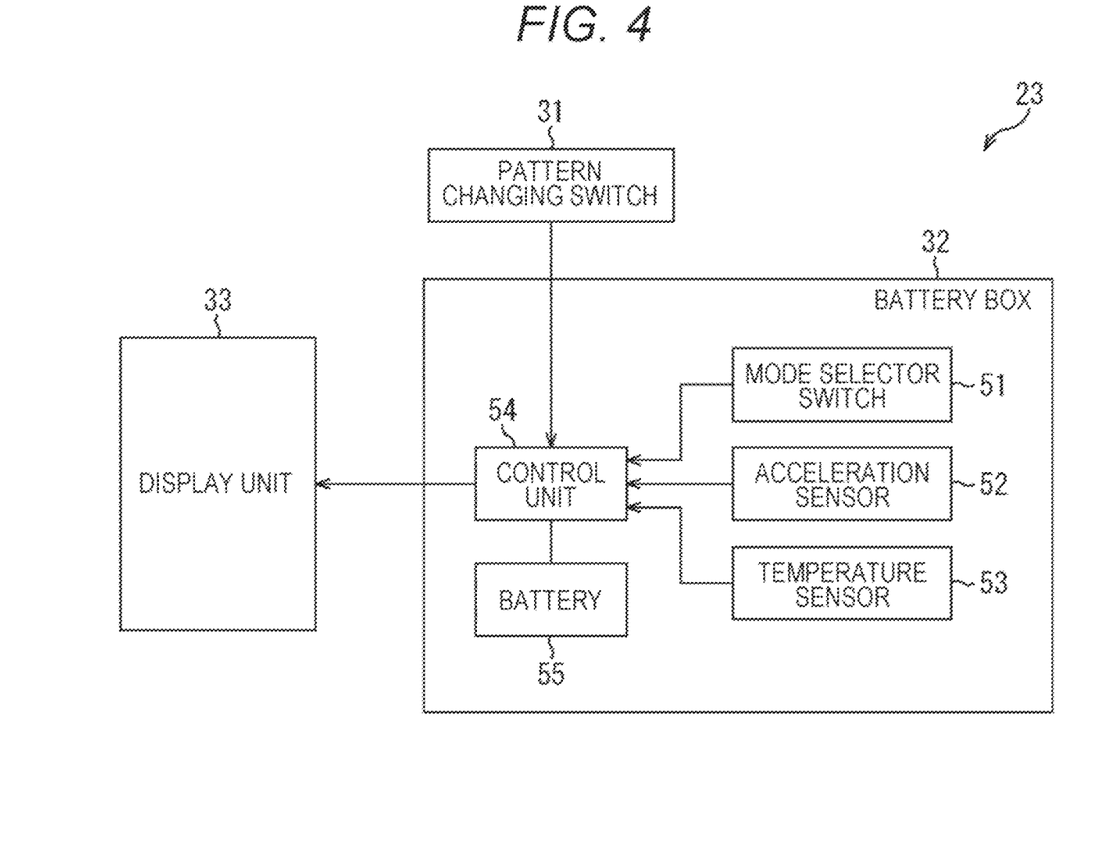
FIG. 4 is a control block diagram of the display module.

FIG. 4 is a control block diagram of the display module 23.

As described above, the display module 23 includes the pattern changing switch 31, the battery box 32, and the display unit 33. The battery box 32 includes the mode selector switch 51, an acceleration sensor 52, a temperature sensor 53, a control unit 54, and a battery 55.

The pattern changing switch 31 detects operation of the user for switching the display pattern of the display module 23 and supplies a switch control signal for switching the display pattern to the control unit 54 as an operation signal.

The mode selector switch 51 detects operation of the user for switching between the automatic mode which is the first operation mode and the manual mode which is the second operation mode and supplies a switch control signal for switching the operation mode to the control unit 54 as an operation signal.

The pattern changing switch 31 and the mode selector switch 51 include, for example, a button switch, a slide switch, a push switch, a lever switch, a dial switch, a touch sensor and the like.

The automatic mode is a mode in which the control unit 54 automatically determines the display pattern of the display unit 33 to control irrespective of an operation input by the user. In a case where the operation mode is set to the automatic mode, the control unit 54 determines the display pattern of the display unit 33 on the basis of a sensor signal output from the acceleration sensor 52 or the temperature sensor 53. The manual mode is a mode for controlling the display unit 33 so as to realize a display pattern selected by the user out of a plurality of types of display patterns determined in advance by operating the pattern changing switch 31.

The acceleration sensor 52 is a sensor (gyroscope sensor) which detects acceleration on three axes of an X axis, a Y axis, and a Z axis, and supplies a detected result to the control unit 54 as the sensor signal.

The temperature sensor 53 is a sensor which detects temperature around the battery box 32, and supplies a detected result to the control unit 54 as the sensor signal.

The control unit 54 controls driving of the electrophoretic display of the display unit 33. In a case where the operation mode is set to the manual mode, the control unit 54 controls the display pattern of the display unit 33 according to the operation of the pattern changing switch 31. On the other hand, in a case where the operation mode is set to the automatic mode, the control unit 54 controls the display pattern of the display unit 33 on the basis of the sensor signal output from the acceleration sensor 52 or the temperature sensor 53.

The control unit 54 may be realized by execution of driver software which drives the electrophoretic display of the display unit 33 by using, for example, a microcomputer, a CPU or the like.

The battery 55 supplies power to each unit of the display module 23.

The display unit 33 includes the electrophoretic display.

A structure of the electrophoretic display is briefly described.

For example, the electrophoretic display has the structure in which a microcapsule-packed layer is interposed between electrode layers from above and below, and the electrode layer on a side visible to the user includes a transparent electrode layer of indium tin oxide (ITO), ZnO and the like.

In the microcapsule-packed layer, microcapsules containing single or a plurality of particles are packed in transparent solution. For example, in a case where two particles of a white particle and a black particle are packed in the microcapsule of the microcapsule-packed layer, when positive voltage is applied to the transparent electrode layer on a display surface side, negatively charged white particles are collected on the transparent electrode layer side and white (color) is displayed. On the other hand, when negative voltage is applied to the transparent electrode layer on the display surface side, positively charged black particles are collected on the transparent electrode layer side and black (color) is displayed. In this manner, in the electrophoretic display, display in white or black becomes possible by controlling the voltage applied to the electrode layer in addition, by setting the applied voltage in a plurality of stages, display in intermediate gradation between white and black (gray display) becomes possible.

The electrophoretic display is characterized by its low power consumption. That is, the electrophoretic display does not require backlight necessary for a liquid crystal display (LCD). Also, in the electrophoretic display, it suffices to flow current only when display is switched, and it is not necessary to flow current in order to maintain the display. Therefore, the electrophoretic display may display with extremely low power consumption as compared with the LCD and the like.

Also, another characteristic of the electrophoretic display is its flexibility. That is, the electrophoretic display has an extremely thin film shape and may change the shape freely to some extent.

Note that the electrophoretic display is not necessarily limited to the microcapsule type described above. Furthermore, this may also be of a type other than an electrophoretic type known as a display type of the electronic paper. That is, the type of the flexible display of the display unit 33 is not limited as long as the display is the electronic paper capable of electrically rewriting a display content out of display media which maintain visibility and portability which are advantages of paper.

For example, voltage of −15.0 V to +15.0 V may be applied to the electrophoretic display of the display unit 33 of this embodiment; black (color) is displayed when −15.0 V is applied, and white (color) is displayed when the voltage of +15.0 V is applied. Also, in a case where intermediate voltage (for example, −3.0 V) between −15.0 V and +15.0 V is applied, it is possible to display gray (color) of intermediate gradation. It is also possible to display gray (color) of intermediate gradation by changing a pulse width by pulse width modulation (PWM) control.

The display unit 33 performs display by a predetermined display pattern under the control or the control unit 54. Herein, the display pattern is intended to mean a pattern or a design by the display color (white, black, and gray color of intermediate gradation) of the display area 61. In the bag 1, changing the display pattern of the display unit 33 corresponds to changing the pattern of the bag 1.

<3. Display Control Process in Manual Node>

Figure 5:
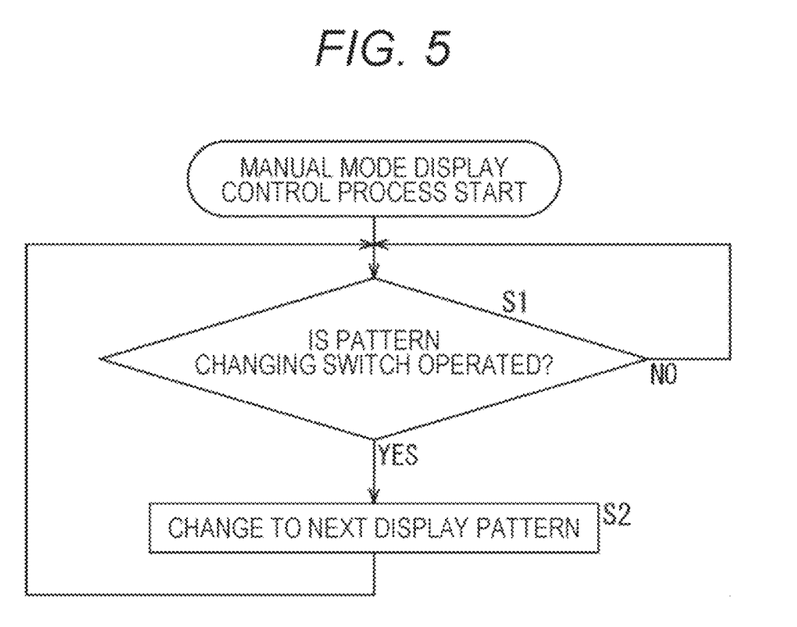
FIG. 5 is a flowchart for illustrating a display control process in a case of a manual mode.

Next, with reference to a flowchart in FIG. 5, a display control process in a case where the operation mode is set to the manual mode is described. The display control process in FIG. 5 is started, for example, when the operation mode is set to the manual mode by the mode selector switch 51.

First, at step S1, the control unit 54 determines whether the pattern changing switch 31 is operated by the user. Then, the process at step S1 is repeated until it is determined that the pattern changing switch 31 is operated.

In a case where it is determined at step S1 that the pattern changing switch 31 is operated, the procedure shifts to step 32, and the control unit 54 refers to a control table stored in an internal memory to change the display pattern of the display unit 33 to a next display pattern.

Figure 6:
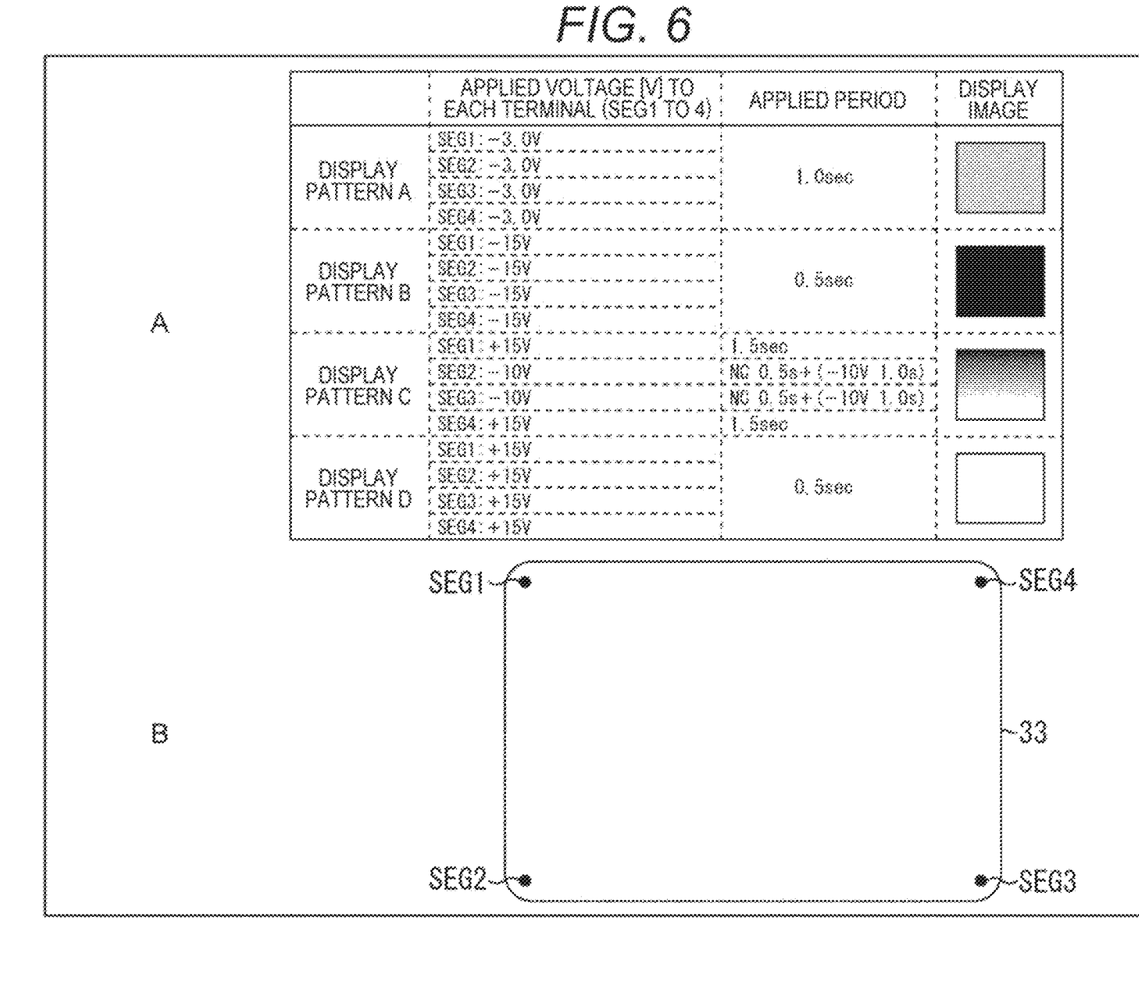
FIG. 6 is a view for illustrating display pattern control based on a control table.

For example, in the internal memory of the control unit 54, the applied voltage and an applied period of each of terminals SEG1 to SEG4 regarding four types of display patterns A to D as illustrated in A of FIG. 6 are stored. The terminals SEG1 to SEG4 are arranged at four corners of the display unit 33 as illustrated in B of FIG. 6, for example.

The display pattern A is a display pattern in which −3.0 V is applied to each of the terminals SEG1 to SEG4 with the applied period of 1.0 sec, thereby allowing the display unit 33 to display in gray.

The display pattern B is a display pattern in which −15.0 V is applied to each of the terminals SEG1 to SEG4 with the applied period of 0.5 sec, thereby allowing the display unit 33 to display in black.

The display pattern C is a display pattern in which 15.0 V is applied to the terminals SEG1 and SEG4 with the applied period of 1.5 sec and −10.0 V is applied to the terminals SEG2 and SEG3 for only final 1.0 sec of the applied period of 1.5 sec of SEG1 and SEG4, thereby allowing the display unit 33 to display in white to black gradation in the longitudinal direction.

The display pattern D is a display pattern in which +15.0 V is applied to each of the terminals SEG1 to SEG4 with the applied period of 0.5 sec, thereby allowing the display unit 33 to display in white.

Immediately after the operation mode is changed to the manual mode, the control unit 54 controls the display unit 33 to be a predetermined display pattern (for example, display pattern A) determined in advance. Then, each time the pattern changing switch 31 is operated, the control unit 54 changes the display pattern in the order of A, B, C, D, A, B, . . . .

For example, in a case where it is determined at step S1 that the pattern changing switch 31 is operated and the current display pattern is the display pattern A, the control unit 54 changes the display pattern of the display unit 33 to the next display pattern B.

For example, in a case where it is determined at step S1 that the pattern changing switch 31 is operated and the current display pattern is the display pattern C, the control unit 54 changes the display pattern of the display unit 33 to the next display pattern D.

For example, in a case where it is determined at step S1 that the pattern changing switch 31 is operated and the current display pattern is the display pattern D, the control unit 54 changes the display pattern of the display unit 33 to the next display pattern A.

Note that the type of the display pattern is not limited to four types as described above, and the control table may be prepared so that more display patterns may be displayed. If there are four types of the display patterns as described above, it is possible to return to the first display pattern by four times of operation, but in a case where there are many types of the display patterns, the number of times of operation for returning to the first display pattern becomes large. Therefore, for example, in a case of detecting predetermined operation such as long push operation of the pattern changing switch 31, the control unit 54 controls to display the first display pattern.

After the display pattern of the display unit 33 is changed to the next display pattern at step S2 in FIG. 5, the procedure returns to step S1, and steps S1 and S2 described above are repeated until the operation mode is changed to the automatic mode.

As described above, in a case where the operation mode is set to the manual mode, the display pattern of the display unit 33 is changed according to the operation of the pattern changing switch 31.

<4. Display Control Process in Automatic Mode>

Figure 7:
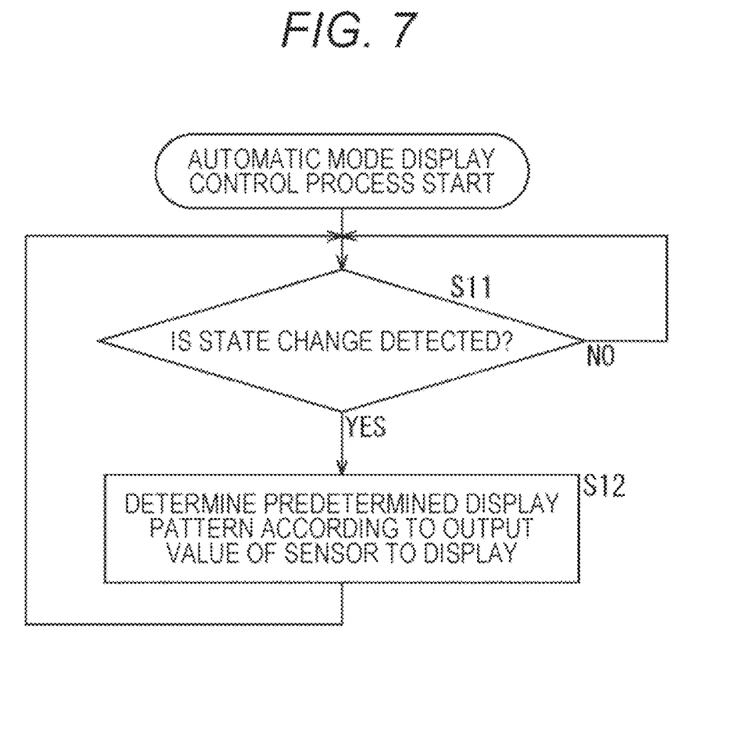
FIG. 7 is a flowchart for illustrating a display control process in a case of an automatic mode.

Next, with reference to a flowchart in FIG. 7, a display control process in a case where the operation mode is set to the automatic mode is described. The display control process in FIG. 7 is started, for example, when the operation mode is set to the automatic mode by the mode selector switch 51.

First, at step S11, the control unit 54 determines whether a state change of the bag 1 is detected on the basis of the sensor signal output from the acceleration sensor 52. Then, the process at step S11 is repeated until it is determined that the state change of the bag 1 is detected.

For example, in a case where the user performs operation of lifting the bag 1, tilting the bag 1 and the like, the acceleration on at least one of the X axis, the Y axis, and the Z axis is detected by the acceleration sensor 52 according to the operation to be supplied to the control unit 54. In a case where the detected acceleration is equal to or greater than a predetermined threshold, the control unit 54 determines at step S11 that the state change of the bag 1 is detected.

In a case where it is determined at step S11 that the state change of the bag 1 is detected, the procedure shifts to step S12, and the control unit 54 determines a predetermined display pattern according to an output value of the acceleration sensor 52 and allows the display unit 33 to display the same.

In the automatic mode, a display pattern out of a plurality of display patterns of the control table to be selected according to the output value of the acceleration sensor 52 is determined in advance.

For example, in a case where the axis on which the acceleration is the greatest out of the X axis, Y axis, and Z axis is the X axis, the display pattern A is selected. In a case where the axis on which the acceleration is the greatest is the Y axis, the display pattern B is selected. In a case where the axis on which the acceleration is the greatest is the Z axis, the display pattern D is selected.

Also, for example, it is determined in advance that the display pattern C is selected in a case where the acceleration in the Z axis direction exceeds a predetermined threshold, and the display pattern D is selected in other states.

Alternatively, the display pattern of the display unit 33 may be determined without using the control table used in the manual mode.

For example, it is also possible to determine the display pattern of the display unit 33 by assigning absolute values of the acceleration on the X, Y, and Z axes which might be detected to the applied voltages of −15.0 V to +15.0 V of the respective terminals SEG1 to SEG3, and controlling the applied voltages of the respective terminals SEG1 to SEG3 according to the absolute values of the detected acceleration.

For example, it is also possible to determine the display pattern of the display unit 33 by using the absolute values of the detected acceleration on the X, Y and Z axes as seeds when calculating a random value, and applying voltage of the calculated random value to the respective terminals SEG1 to SEG4.

By controlling the applied voltages to the respective terminals SEG1 to SEG4 to different voltages, gradation expression becomes possible, an expression range is widened, and the design quality of the bag 1 is improved.

After the display pattern of the display unit 33 is changed to a predetermined display pattern at step S12 in FIG. 7, the procedure returns to step S11, and steps S11 and S12 described above are repeated until the operation mode is changed to the manual mode.

As described above, in a case where the operation mode is set to the automatic mode, the display pattern of the display unit 33 is automatically changed according to the output value of the acceleration sensor 52.

The display control process in the automatic mode illustrated in the flowchart in FIG. 7 is a process of controlling the display pattern of the display unit 33 on the basis of the output value of the acceleration sensor 52. Similarly, the display module 23 may also control the display pattern of the display unit 33 on the basis of the output value of the temperature sensor 53. It is also possible that the user may select the output value of the acceleration sensor 52 or the output value of the temperature sensor 53 on which the display pattern of the display unit 33 is controlled.

<5. Application Example to Other Bags>

In the display module 23 of the present disclosure, the three components of the pattern changing switch 31, the battery box 32, and the sheet-shaped display unit 33 are connected to one another by the wire harnesses 34 and 35. As a result, it is possible to arrange the pattern changing switch 31 and the battery box 32 in arbitrary parts only by changing the lengths of the wire harnesses 34 and 35.

Also, since it is possible to arrange the pattern changing switch 31 and the battery box 32 in arbitrary parts by changing the lengths of the wire harnesses 34 and 35, the display module 23 may be used in various types of bags.

Figure 8:
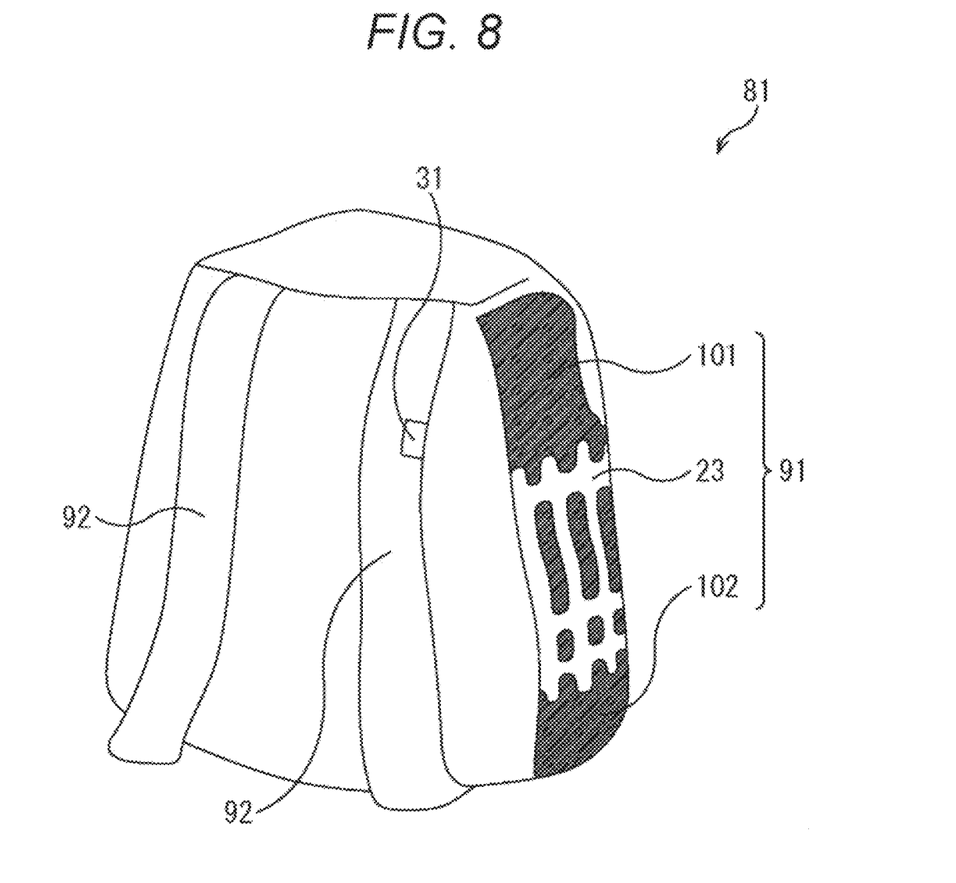
FIG. 8 is a view illustrating a configuration example of a backpack as another embodiment to which the present technology is applied.

FIG. 8 is a view illustrating an example of a backpack as an example in which the display module 23 is applied to other bags.

A backpack 81 in FIG. 8 includes a bag body 91 and a shoulder belt 92, and the bag body 91 includes an upper bag body 101, a lower bag body 102, and a display module 23. As described with reference to FIG. 3, elongated connecting units of the upper bag body 101 and the lower bag body 102 are allowed to pass through a plurality of holes 62, so that the display module 23 is connected to the upper bag body 101 and the lower bag body 102.

The pattern changing switch 31 of the display module 23 is arranged in a predetermined part of the shoulder belt 92 which is near the chest of the user when the backpack 81 is carried on the back, taking the usability of the backpack 81 into consideration.

In this manner, since it is possible to arrange the pattern changing switch 31 and the battery box 32 to arbitrary parts, the display module 23 may be applied to various types of bags. That is, it is possible to apply the display module 23 the design quality of which is improved by variously changing the display pattern to various types of bags.

<6. Another Configuration Example of Display Module>

Figure 9:
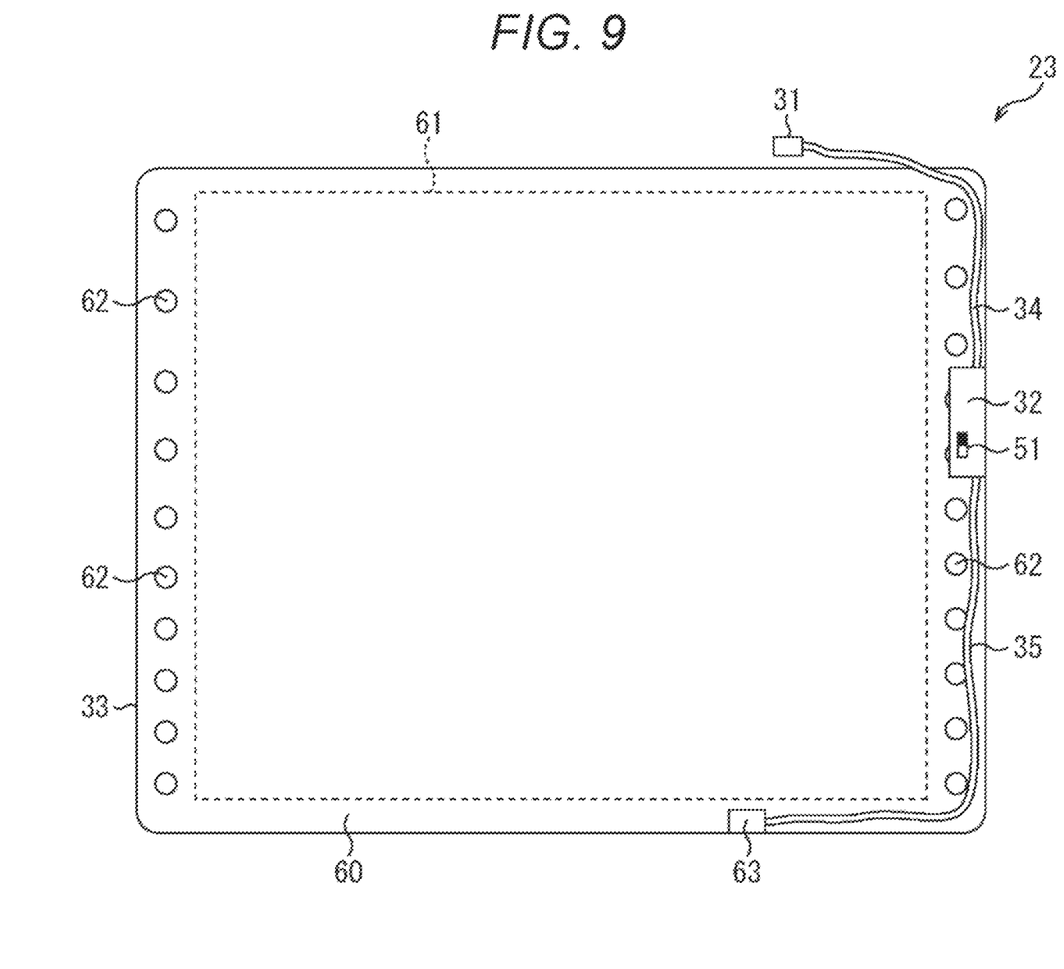
FIG. 9 is a view illustrating another configuration example of a display module.

FIG. 9 illustrates another configuration example of the display module 23.

In the configuration of the display module 23 described above, as illustrated in FIG. 2, a plurality of holes 62 serving as the connecting unit is formed in the display area 61 which is an electrophoretic display portion.

On the other hand, in the display module 23 illustrated in FIG. 9, a plurality of holes 62 serving as the connecting unit is formed in the non-display area 60 on the outer peripheral portion. In this manner, it is also possible that a plurality of holes 62 as the connecting unit is formed only in the peripheral portion of the sheet-shaped display unit 33. Note that, although a planar shape of the sheet-shaped display unit 33 is quadrangular in FIGS. 2 and 9, the planar shape of the display unit 33 may be an arbitrary shape (for example, trapezoidal shape) suitable for the shape of the bag to be assembled.

<7. Another Configuration of Connecting Unit>

Figure 10:
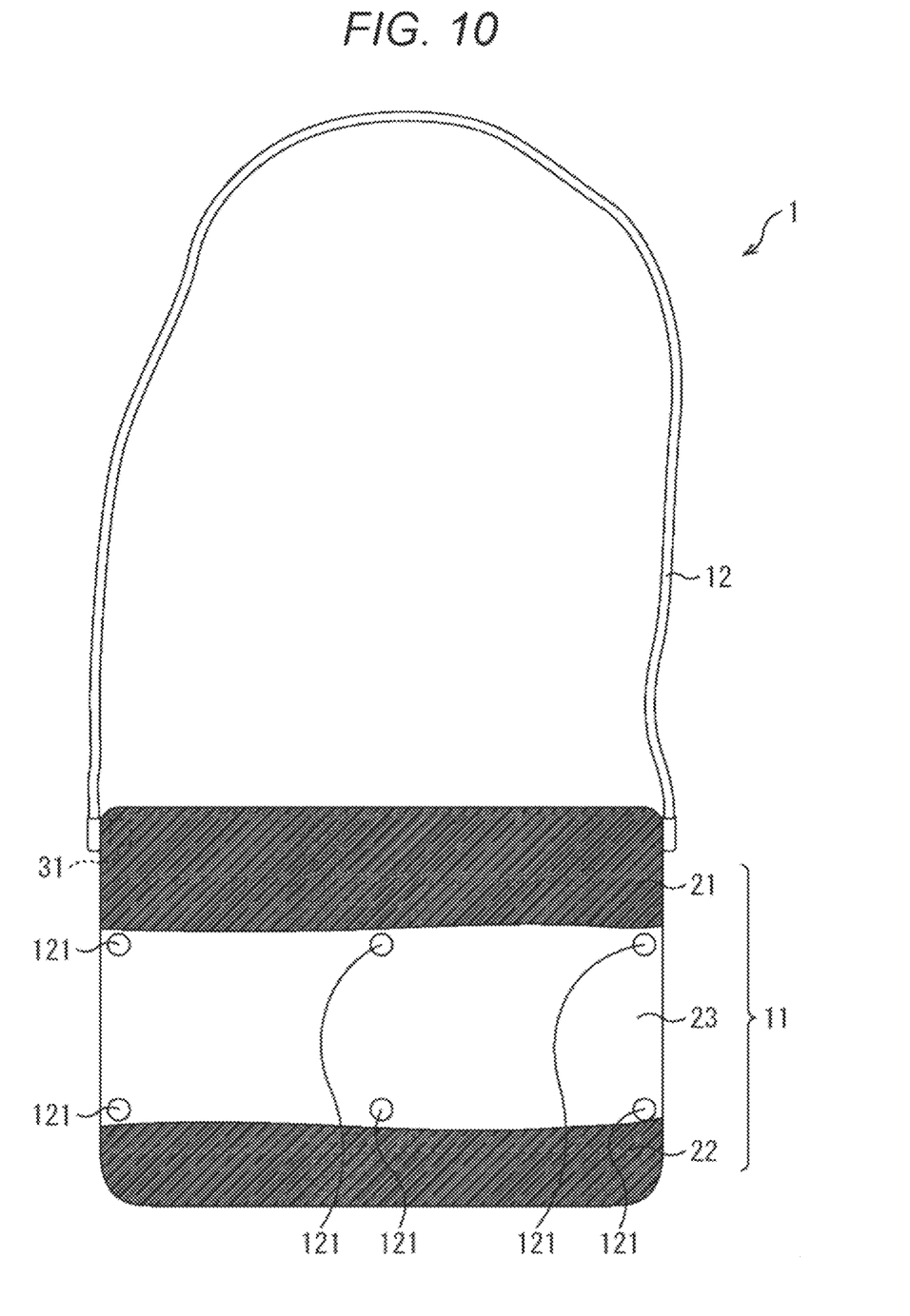
FIG. 10 is a view illustrating another configuration example of a connecting unit of a display module.

FIG. 10 is a view illustrating another configuration example of the connecting unit of the display module 23.

In the display module 23 of the bag 1 illustrated in FIG. 10, a configuration which takes the place of the above-described plurality of holes 62 is adopted as the connecting unit to connect to the main body upper portion 21 and the main body bottom portion 22.

Specifically, in the display module 23 of the bag 1 in FIG. 10, a plurality of snap buttons 121 is provided as the connecting unit to connect to the main body upper portion 21 and the main body bottom portion 22. By using the snap button 121, it is possible to easily remove the display unit 33. The connecting terminal 63 (not illustrated) of the display unit 33 may be easily attached to/detached from the wire harness 35 by using a universal serial bus (USB) connector or the like, for example. A pocket capable of displaying different display patterns may be realized by making an area to which the display unit 33 is attached a surface of a pocket portion of the bag 1, for example, and replacing the pocket integrated with the display unit 33.

<8. Application Example to Other Articles>

In the above-described embodiment, the example in which the display module 23 for improving the design quality is applied to various bags (the bag 1 and the backpack 81) is described. In this case, the sheet-shaped display unit 33 of the display module 23 is formed to have a size and a shape suitable for the assembly of the bag, but the display module 23 of the present disclosure is also applicable, for example, to articles other than the bag such as shoes, clothes, and eyeglasses. The size and shape of the display unit 33 are designed to be the size and shape according to the article to which the display module is applied, and it is possible to apply the display module 23 of a specific size and a specific shape to the same articles of the various types by using a characteristic that the pattern changing switch 31 and the battery box 32 may be arranged in arbitrary parts only by changing the lengths of the wire harnesses 34 and 35.

The embodiments of the present technology are not limited to the above-described embodiments and various modifications may be made without departing from the gist of the present technology.

For example, it is possible to adopt a mode obtained by appropriately combining all or some of the embodiments described above.

Also, for example, although the display module 23 is provided with the acceleration sensor 52 as the first sensor and the temperature sensor 53 as the second sensor in the above-described embodiment, it is also possible that this is provided with only one of them.

Alternatively, as the first or second sensor, or as a third sensor, a sensor other than the acceleration sensor 52 and the temperature sensor 53 may also be provided. For example, a brightness sensor (illuminance sensor) may be provided as the second sensor, and the applied voltage of each of the terminals SEG1 to SEG4 may be changed on the basis of a detected result to change the display pattern. In other words, the sensor provided on the display module 23 is not limited to the acceleration sensor 52 and the temperature sensor 53.

Although the example in which the electronic paper typified by the electrophoretic display is adopted as the sheet-shaped thin and flexible display of the display unit 33 is described in the embodiment described above, an organic electro luminescence (EL) display may also be adopted in addition to this.

Note that the effects described in this specification are illustrative only and are not limited; the effects other than those described in this specification may also be included.

Note that the present technology may also have following configurations.

(1)
A display module provided with:
a sheet-shaped display unit having flexibility;
a switch unit which switches a display pattern of the display unit; and
a control unit which controls the display pattern of the display unit on the basis of a switch control signal from the switch unit,
in which the display unit is electrically connected to the control unit, and the control unit is electrically connected to the switch unit by using a wiring cable.

(2)
The display module according to (1) described above,
in which the display unit includes a connecting unit for connecting to another member.

(3)
The display module according to (2) described above, in which the connecting unit includes a plurality of holes, and
the other member having an elongated shape is allowed to pass through the holes, so that the other member is connected to the display unit.

(4)
The display module according to (3) described above,
in which an area of the display unit in which the other member in the elongated shape allowed to pass through the holes is arranged on a front surface forms a non-display area of which display does not change by control by the control unit.

(5)
The display module according to any one of (1) to (4) described above, further provided with:
a sensor which detects a predetermined state,
in which the control unit further controls the display pattern of the display unit on the basis of a sensor signal output by the sensor.

(6)
The display module according to any one of (1) to (5) described above, further provided with:
a mode switch unit which switches between a first operation mode for switching the display pattern on the basis of the switch control signal from the switch unit and a second operation mode for switching the display pattern on the basis of the sensor signal.

(7)
The display module according to any one of to (4) described above,
in which the connecting unit is formed in a display area of the display unit.

(8)
The display module according to any one of to (4) or (7) described above,
in which the display unit includes the display area and the non-display area around the display area, and
the connecting unit is formed in the non-display area.

(9)
The display module according to any one of (2) to (4), (7), or (8) described above,
in which the other member is fabric of a bag.

(10)
A bag provided with:
a display module including:
a sheet-shaped display unit having flexibility;
a switch unit which switches a display pattern of the display unit; and
a control unit which controls the display pattern of the display unit on the basis of a switch control signal from the switch unit,
in which an elongated member is allowed to pass through a hole of the display unit, so that the display module is fixed.

REFERENCE SIGNS LIST

1 Bag
11 Main body portion
21 Main body upper portion
22 Main body bottom portion
23 Display module
31 Pattern changing switch
32 Battery box
33 Display unit
34, 35 Wire Harness
41, 42 Connecting unit
51 Mode selector switch
52 Acceleration sensor
53 Temperature sensor
54 Control unit
55 Battery
60 Non-display area
61 Display area.
62 Hole
81 Backpack
121 Snap button

The invention claimed is:
1. A display module comprising:
a sheet-shaped display having flexibility and including a front surface and a rear surface;
a switch unit configured to switch a display pattern of the display;
a control unit configured to control the display pattern of the display based on a switch control signal from the switch unit; and
an acceleration sensor configured to detect acceleration on a plurality of axes and output the detected acceleration to the control unit as a sensor signal,
wherein the control unit is further configured to determine the display pattern of the display based on random values generated from absolute values of the detected acceleration of the sensor signal,
wherein the display is electrically connected to the control unit, and the control unit is electrically connected to the switch unit by using a wiring cable, and wherein the switch unit and the control unit are each implemented via at least one processor.

2. The display module according to claim 1, further comprising:

another sensor configured to output a detected value as another sensor signal, wherein the control unit is further configured to determine the display pattern of the display based on the detected value of the another sensor signal, and wherein the another sensor includes at least one of a temperature sensor or an illuminance sensor.

3. The display module according to claim 2, further comprising:

a battery box electrically connected to the display, wherein the battery box includes a battery, the switch unit, the control unit, and the another sensor, wherein the another sensor is the temperature sensor, wherein the temperature sensor detects a temperature of the battery box and outputs the detected temperature as the another sensor signal, and wherein the control unit is further configured to determine the display pattern of the display based on the detected temperature of the another sensor signal.

4. The display module according to claim 1, further comprising:

a mode switch unit configured to switch between a first operation mode for switching the display pattern based on the switch control signal from the switch unit and a second operation mode for switching the display pattern based on the sensor signal, wherein the mode switch unit is implemented via at least one processor.

5. The display module according to claim 1, wherein the display includes a plurality of snap buttons provided as a connecting unit for connecting to a main body upper portion of a bag and a main body bottom portion of the bag, and wherein the plurality of snap buttons connect to the main body upper portion of the bag and the main body bottom portion of the bag at a pocket portion of the bag to form a pocket.

6. The display module according to claim 5, wherein the display includes a non-display area of which display does not change by control by the control unit, wherein the display includes a display area of which display does change by control by the control unit, wherein the display includes the display area and the non-display area around the display area, and wherein the connecting unit is formed in only the non-display area.

* * * * *